United States Patent
Cabagnero

[19]

[11] Patent Number: 6,062,587
[45] Date of Patent: May 16, 2000

[54] FOLDABLE PUSH-CHAIR FOR BABIES

[75] Inventor: Ramon Jane Cabagnero, Palau De Plegamans, Spain

[73] Assignee: Jane, S.A., Palau De Plegamans, Spain

[21] Appl. No.: 09/047,730

[22] Filed: Mar. 25, 1998

[30] Foreign Application Priority Data

Mar. 25, 1997 [ES] Spain ................................. 9700774 U
Nov. 3, 1997 [ES] Spain ................................. 9702830 U

[51] Int. Cl.$^7$ ............................................ B62B 3/02
[52] U.S. Cl. ....................... 280/642; 280/47.38; 280/650
[58] Field of Search .................................. 280/649, 650, 280/641, 642, 647, 47.38, 639, 47.34, 47.41

[56] References Cited

U.S. PATENT DOCUMENTS

| | | | |
|---|---|---|---|
| 4,697,823 | 10/1987 | Kassai | 280/644 |
| 4,819,958 | 4/1989 | Perego | 280/644 |
| 5,143,398 | 9/1992 | Teng | 280/642 |
| 5,181,735 | 1/1993 | Onishi | 280/642 |
| 5,549,311 | 8/1996 | Huang | 280/47.36 |
| 5,645,293 | 7/1997 | Cheng | 280/642 |
| 5,845,924 | 12/1998 | Huang | 280/642 |

*Primary Examiner*—Brian L. Johnson
*Assistant Examiner*—Avraham H. Lerner
*Attorney, Agent, or Firm*—Steinberg & Raskin, P.C.

[57] ABSTRACT

A foldable stroller for babies including a chassis having side frames which are foldable around a hinged middle portion. Each side frames includes a handle-bar arm linked in a hinged connection to the front leg. A bushing is slidingly arranged on a lower portion of the handle-bar arm and includes a cap removably engaging with an upper end of the front leg. A bracket is fastened to the upper end of the front leg and the handle-bar arm is linked in a hinged connection to a lower portion of the bracket. The bushing is spring-loaded towards its engaging position and connected with a control element provided at the upper portion of the handle-bar arm and which enables the bushing to be disengaged from the bracket. The bushing may alternatively include at its lower opening, a recess for removably engaging a projection on the bracket.

19 Claims, 3 Drawing Sheets

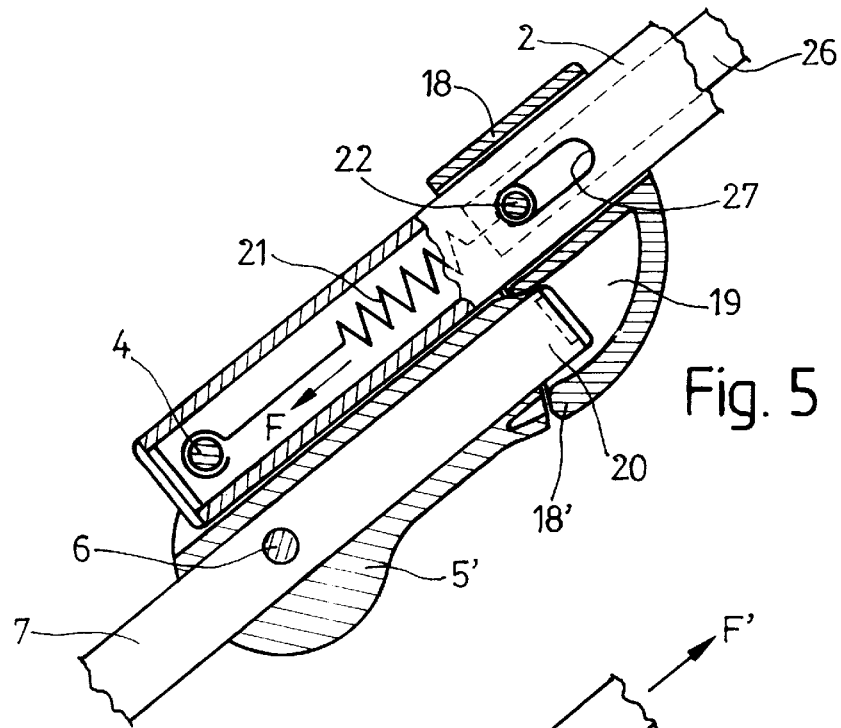
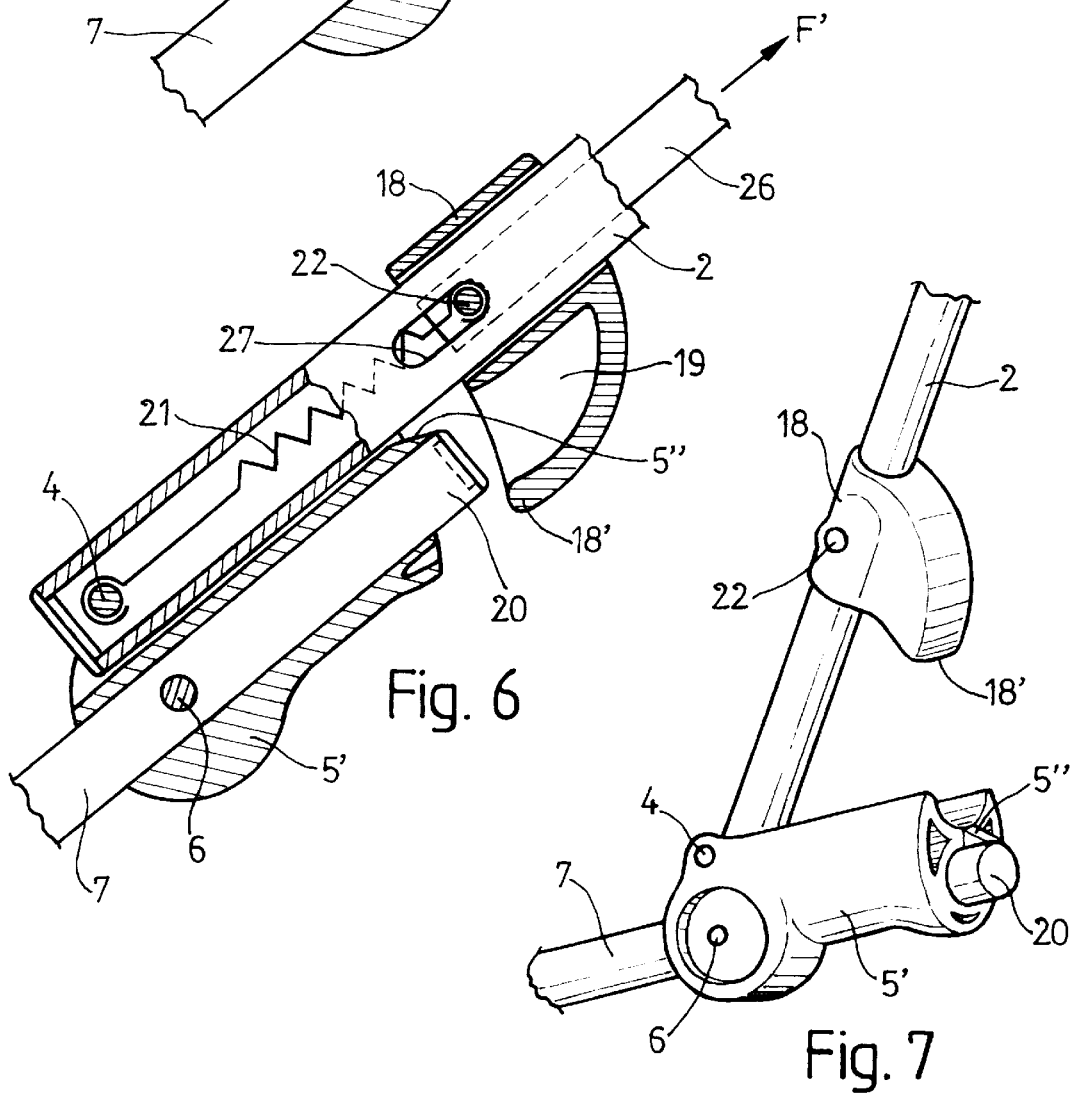

FOLDABLE PUSH-CHAIR FOR BABIES

FIELD OF THE INVENTION

The present invention relates to a foldable or collapsible push-chair (stroller) for babies of the type that can be folded about a middle portion of its side frames and in which the side frames can also be brought together when folding the stroller. The side frames advantageously end at their upper end in a handle by way of crook allowing the stroller to be carried hanging from the arm once it has been folded.

BACKGROUND OF THE INVENTION

Strollers of this type, also referred to as a push-chair herein, have a chassis whose side frames comprise a handle-bar arm linked in a hinged connection to the front leg and the rear leg, a side sill provided for the seat and hinged between the legs, and optionally a side member which is often coupled to the back of the seat and linked in a hinged connection to the side sill.

Further, strollers of this kind have been widely accepted in the market because of their simplicity and light weight, but they present nevertheless a serious problem arising at the hinged connection of the lower end of the handle-bar arm with the upper end of the front leg. This hinged connection is often carried out with a bracket solid with the leg and to which the handle-bar arm is linked in a hinged connection.

As a result of the weight of the baby and any bags loaded on the stroller, and to sudden movements when pushing the stroller, such as for example when pushing it up or down sidewalks and stairs, the hinged connection is overstressed thus causing at least a partial folding of the side frame of the stroller with the consequent danger thus created for the baby's integrity.

OBJECTS AND SUMMARY OF THE INVENTION

It is an object of the present invention to overcome the drawback of conventional strollers and avoid overstressing the hinged connection between the handle-bar arm and the upper end of the front leg.

It is another object of the present invention to provide new and improved strollers.

It is yet another object of the present invention to provide a stroller in which the unfolded position thereof is reinforced by means of a second device locking the stroller in the unfolded position and complementing the conventional locking means generally formed by a single or double compass arranged between both rear legs at their lower portion. This construction obviates the need to provide other locking means such as a compass situated between the handle-bar arms or between the front legs, which locking means generally are the cause of deformations and breakages in the chassis of the stroller due to an inadvertent folding of the latter without having unlocked the same or after having deficiently unlocked them.

In order to achieve the objects stated above and others, the stroller in accordance with the invention comprises a bushing slidingly arranged around a lower portion of the handle-bar arm and comprises a cap that removably engages the upper end of the front leg, which is where the bracket is fastened to whose lower portion the handle-bar arm is linked in a hinged connection. The bushing is spring-loaded towards its engaging position and connected with a control element provided at the upper portion of the handle-bar arm. This control element allows disengagement of the bushing.

In order to achieve a perfect fit between both elements to be mutually engaged, and to thus have a device allowing to fit armrests to the stroller without impairing the safety of the engagement contributing to lock the unfolded position of the stroller, the bushing forms at its lower opening a recess structured and arranged to snugly and removably engage a projection of the upper opening of the bracket. This engagement is equally assured by the action of a spring.

The bushing may also have at each of both sides a slider slot through which the pin attaching the rear portion of the armrests of the stroller to the corresponding handle-bar arms is arranged.

A basic embodiment of the stroller in accordance with the invention comprises a chassis having side frames, each side frame including a front leg having an upper end, a bracket mounted at the upper end of the front leg, a handle-bar arm hingedly connected to the front leg proximate the upper end of the front leg, and a bushing slidingly arranged on the handle-bar arm. The bushing comprises a cap arranged to removably engage the upper end of the front leg and is spring-loaded toward an engaging position in which the cap engages with the bracket. The stroller also includes a control element arranged on the handle-bar arm and coupled to the bushing. The control element is arranged to displace the bushing into a disengaging position in which the cap is separated from the bracket and the handle-bar arm is pivotable with respect to the front leg. The handle-bar arm has a lower portion and an upper portion, and is hingedly connected to the front leg at the lower portion while the control element is arranged at the upper portion of the handle-bar arm. The control element may comprise a control bushing arranged in the upper portion of the handle-bar arm and movable along a predetermined length, and a link element extending in an interior of the handle-bar arm to connect the control bushing to the bushing.

In some embodiments, the upper portion of the handle-bar arm comprises a pair of slider slots in opposed relationship to each other and the control element comprises a pin coupled to the control bushing and slidable in the slider slots. The link is connected to the pin. An additional pin may be connected to the bushing and extending through an interior of the handle-bar arm, whereby the link is also attached to this additional pin.

Biasing means are arranged in the handle-bar arm for biasing the bushing toward the engaging position, e.g., a spring connected at one end to a lower end of the handle-bar arm and at an upper end to a pin coupled to the bushing and extending through an interior of the handle-bar arm.

The handle-bar arm includes a tubular section whereby the bushing is arranged around a portion of the tubular section of the handle-bar arm. The cap may comprise a recessed aperture in the bushing, the upper end of the front leg being arranged to be received within the aperture when the bushing is in the engaging position.

In another embodiment, the bushing on each side same includes a recess receivable of a projection on the bracket, the bushing being spring-loaded toward an engaging position in which the recess receives the projection. In this case, the control element is arranged to displace the bushing into a disengaging position in which the projection is removed from the recess and the handle-bar arm is pivotable with respect to the front leg. The bushing may further comprises a pair of opposed slider slots and a pin extending through the slider slots while the stroller includes armrests having a rear portion attached via the pin to a respective one of the handle-bar arms.

In the following, the invention will be described in more detail with reference to the figures in the accompanying drawings. However, the invention is not strictly confined to the details of the illustrated embodiments.

BRIEF DESCRIPTION OF THE DRAWINGS

Additional objects of the invention will be apparent from the following description of the preferred embodiment thereof taken in conjunction with the accompanying non-limiting drawings, in which:

FIG. 5 is a sectional side elevation of the means provided for the engagement between the handle-bar arm and the front leg in the engaging position;

FIG. 6 is a sectional side elevation of the means provided for the engagement between the handle-bar arm and the front leg, in the disengaging position;

FIG. 7 shows in a perspective view the start of the folding of the side frame of the stroller round its hinged middle portion.

DETAILED DESCRIPTION OF THE PREFERRED EMBODIMENTS

Figure 1:
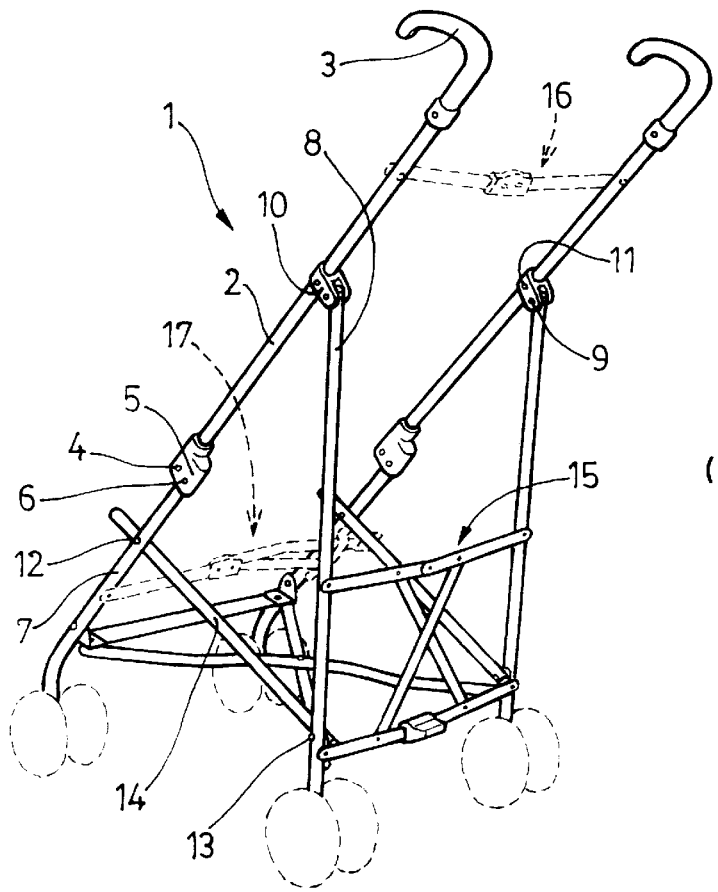
FIG. 1 shows in a perspective view the chassis of a conventional stroller.
Figure 2:
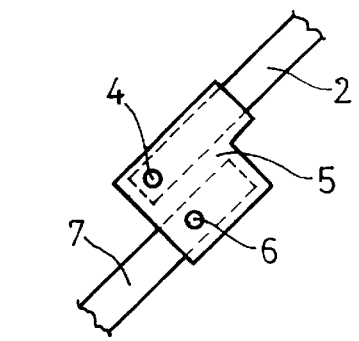
FIG. 2 shows in a side elevation the conventional hinged connection between the handlebar arm and the front leg in its normal position and in the position it adopts when overstressed.
Figure 3:
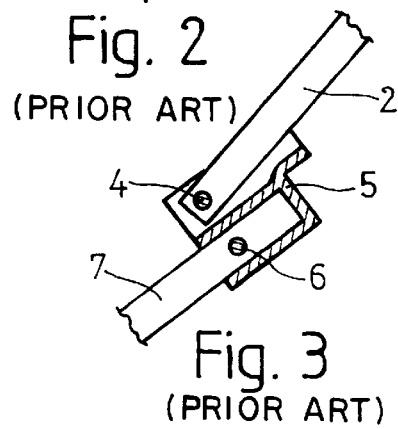
FIG. 3 shows in a sectional side elevation the conventional hinged connection between the handle-bar arm and the front leg in its normal position and in the position it adopts when overstressed.
Figure 4:
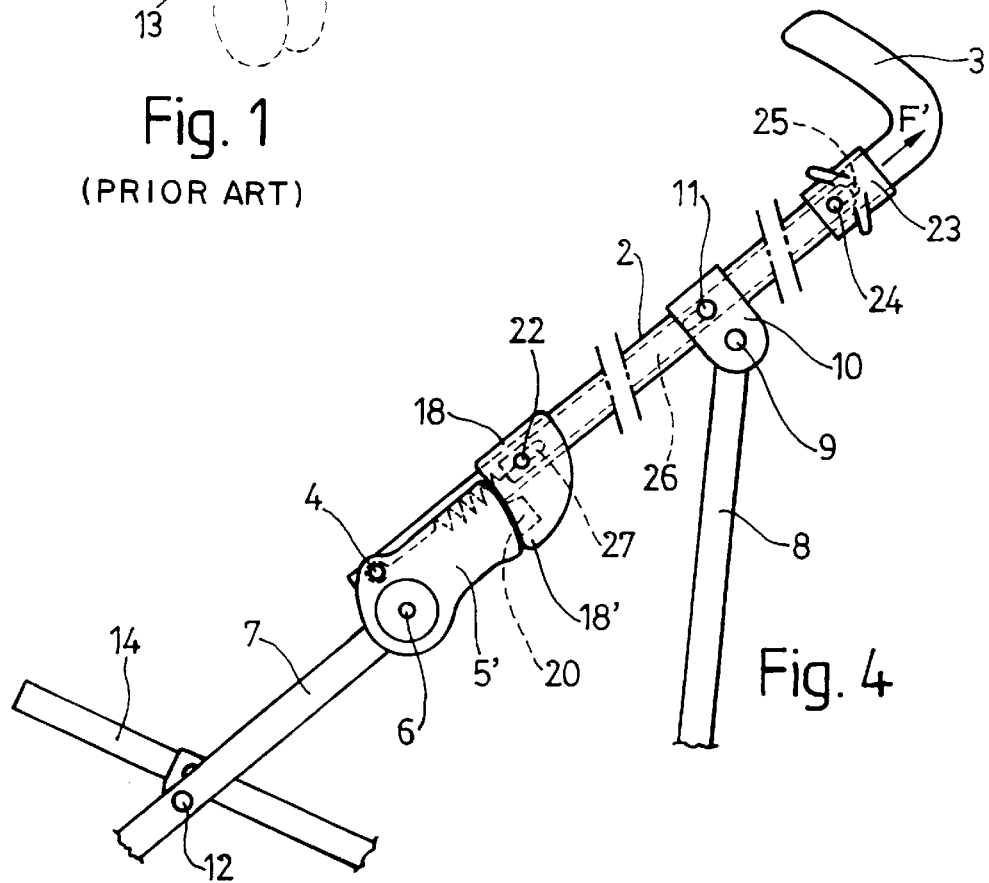
FIG. 4 illustrates in a side elevation a side frame of the chassis of the stroller in accordance with the invention.

Referring to the accompanying drawings wherein like reference numerals refer to the same or similar elements, a conventional stroller can be seen in FIG. 1 whose chassis 1 comprises at each side frame, a handle-bar arm 2 having an upper end at which a handle 3 is arranged. The lower end of the arm 2 is linked in a hinged connection by means of a pin 4 to a bracket 5 to which the upper end of a front leg 7 is fastened by means of a rivet 6. The side frame of the chassis is completed by a rear leg 8 which is linked at its upper end in a hinged connection by means of a pin 9 to a bracket 10 solidly secured by means of a rivet 11 to a middle portion of handle-bar arm 2. A side sill 14 is linked in a hinged connection to arm 2 and rear leg between legs 7 and 8 and by means of pins 12 and 13. Side sill 14 supports a flexible seat (not shown).

In this construction, locking means 15 are provided to lock the stroller in its unfolded position and comprise a double compass and two crossed links, and are installed between the rear legs 8 at their lower portion.

In this kind of conventional chassis for a stroller, a second locking means is provided which usually consist of a compass 16 arranged at the upper portion between the handle-bar arms, or in a compass 17 installed between the front legs 7.

Referring now to FIGS. 4–7, a stroller in accordance with the invention includes a bushing 18 slidingly fitted around a lower portion of the handle-bar arm 2 and comprises an integral cap 19 (FIGS. 5 and 6) that is removably engaged with an upper end 20 of front leg 7 projecting from bracket 5'. This bushing 18 is spring-loaded toward its engaging or locking position by the action F of a spring 21 secured at one end to a pin 22 arranged through bushing 18, and at the other end to the hinge pin 4.

Bushing 18 is connected with a control element 23 (FIG. 4) provided at the upper portion of handle-bar arm 2, in such a way that the disengagement of the bushing 18, and hence the unlocking of the handle-bar arm 2 from engagement to the front leg 7 which allows the stroller to be folded, is achieved by upwardly pulling this control element 23 in the direction of arrow F.

The control element 23 is formed by a bushing slidingly fitted around handle-bar arm 2 and by means of a cross pin 24 sliding in a slider slot 25 of the handle-bar arm limiting the sliding motion to a predetermined length. Bushing 23 is connected with bushing 18 by means of a link 26 attached to pin 22 sliding in a slider slot 27 of handle-bar arm 2.

It will be understood that by pulling bushing 23 in the direction of arrow F', link 26 will upwardly shift cap-bushing 18 thus freeing it from the upper end 20 of the front leg (FIG. 6). Thereafter, handle-bar arm 2 will be in a position to swing around pin 4 to allow the stroller to be folded.

The engagement of cap-bushing 18 takes place automatically when unfolding the stroller, since the lower edge 18' of the cap-bushing encounters an incline 5" of bracket 5'. Bushing 18 is thus shifted in this manner extending spring 21, and when cap 19 encounters the upper end 20 of the front leg, it engages this end by virtue of the spring's recovery.

Figure 8:
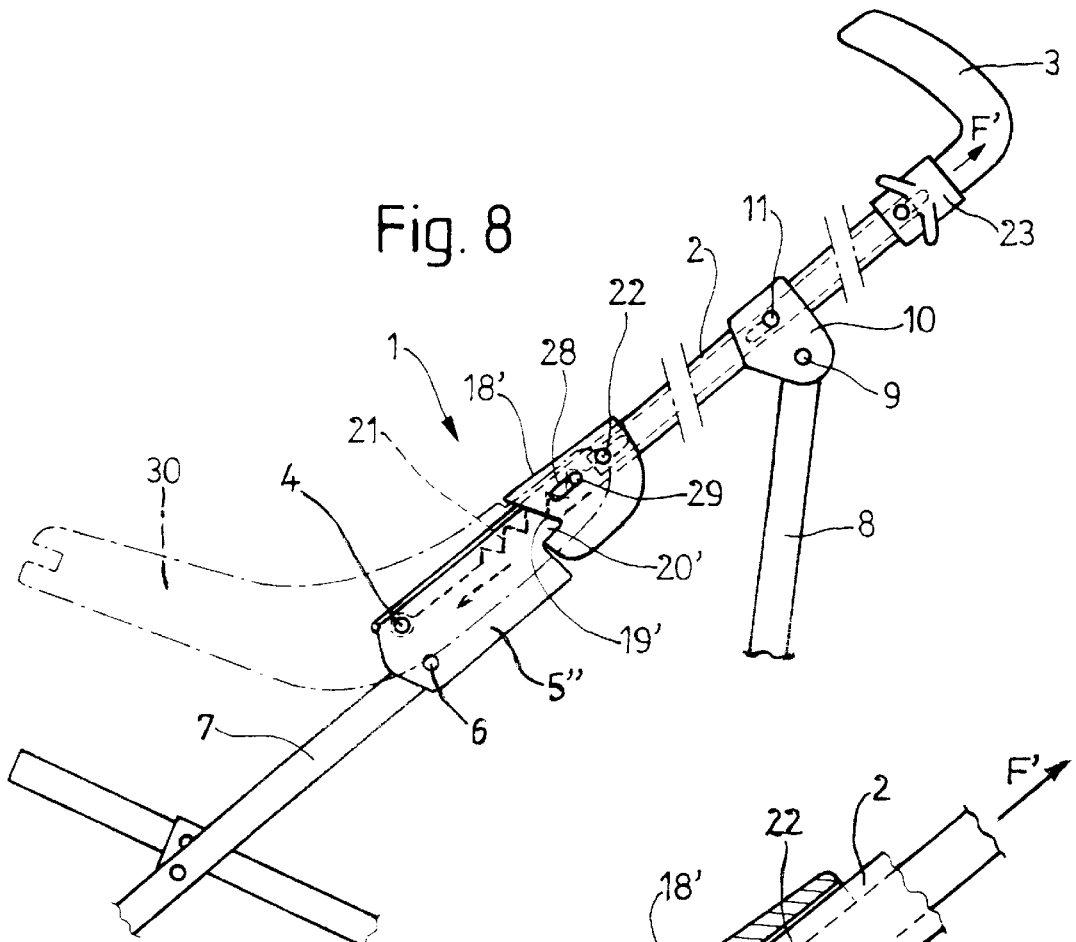
FIG. 8 illustrates in a side elevation a side frame of the chassis of a second embodiment of a stroller in accordance with the invention.
Figure 9:
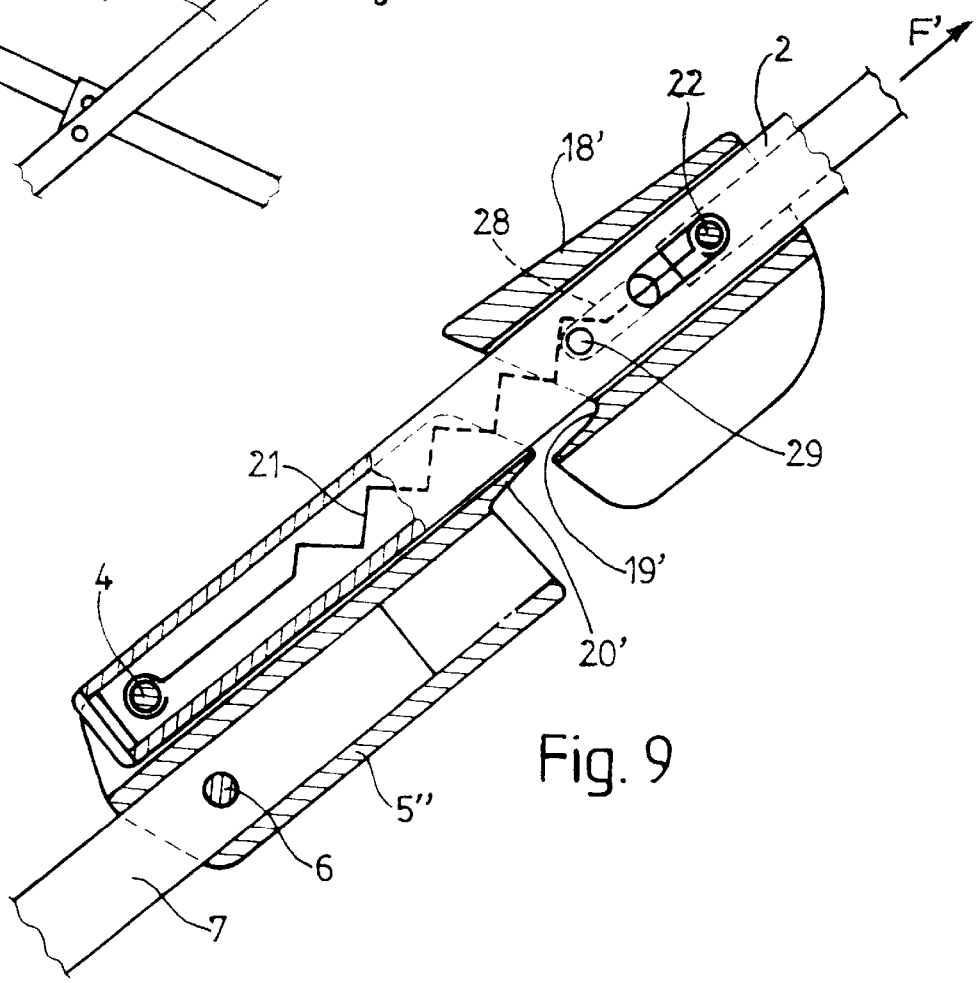
FIG. 9 is a sectional side elevation of the means provided for the engagement between the handle-bar arm and the front leg as per FIG. 8 in an unlocked position.

Referring now to FIGS. 8 and 9, in this embodiment of the invention, a bushing 18' is slidingly fitted around a lower portion of the handle-bar arm 2 and comprise at its lower opening, an angular recess 19' that is arranged to snugly and removably engage an angular projection 20' of the upper opening of bracket 5".

Bushing 18' is spring-loaded towards its engaging position by the action F of spring 21, and is connected with control element 23. Bushing 18' has at each of both sides, a slider slot 28 through which pin 29 is fitted thereby attaching the rear portion of the armrests 30 of the stroller to the corresponding handle-bar arms 2. The slider slots provide the adequate independence of bushing 18' with respect to the armrest.

In the following, the patent claims will be given, and the various details of the invention can show variation within the scope of the inventive idea defined in the claims and differ even to a considerable extent from the details stated above by way of example only. As such, the examples provided above are not meant to be exclusive and many other variations of the present invention would be obvious to those skilled in the art, and are contemplated to be within the scope of the appended claims.

I claim:

1. A baby stroller, comprising
a chassis having side frames, each of said side frames including
a front leg having an upper end,
a bracket mounted at said upper end of said front leg,
a handle-bar arm hingedly connected to said front leg proximate said upper end of said front leg, said handle-bar arm having a lower portion and an upper portion comprising a pair of slider slots in opposed relationship to each other, said handle-bar arm being hingedly connected to said front leg at said lower portion, a bushing slidingly arranged on said handle-bar arm, said bushing comprising a cap arranged to removably engage said upper end of said front leg, said bushing being spring-loaded toward an engaging position in which said cap engages with said bracket, and a control element arranged on said upper portion of said handle-bar arm and coupled to said bushing, said control element being structured and arranged to displace said bushing into a disengaging position in which said cap is separated from said bracket and said handle-bar arm is pivotable with respect to said front leg, said control element comprising a control bushing arranged in said upper portion of said handle-bar arm and movable along a predetermined length, a link element extending in an interior of said handle-bar arm to connect said control bushing to said bushing, and a pin coupled to said control bushing and slidable in said slider slots.

2. The stroller of claim 1, wherein said link is connected to said pin.

3. The stroller of claim 1, further comprising an additional pin connected to said bushing and extending through an interior of said handle-bar arm, said link being attached to said pin and said additional pin.

4. The stroller of claim 1, further comprising biasing means arranged in said handle-bar arm for biasing said bushing toward said engaging position.

5. The stroller of claim 4, further comprising a pin coupled to said bushing and extending through an interior of said handle-bar arm, said biasing means comprise a spring connected at one end to a lower end of said handle-bar arm and at an upper end to said pin.

6. The stroller of claim 1, wherein each of said side frames further comprises a rear leg pivotally connected to said handle-bar arm.

7. The stroller of claim 1, wherein said handle-bar arm has a tubular section, said bushing being arranged around a portion of said tubular section of said handle-bar arm.

8. The stroller of claim 1, wherein said cap comprises a recessed aperture in said bushing, said upper end of said front leg being arranged to be received within said aperture when said bushing is in said engaging position.

9. The stroller of claim 1, wherein said handle-bar arm is hingedly connected to said bracket.

10. The stroller of claim 1, wherein said bracket includes an inclined portion facing said handle-bar arm.

11. A baby stroller, comprising
a chassis having side frames,
each of said side frames including
a front leg having an upper end,
a bracket mounted at said upper end of said front leg and including a projection,
a handle-bar arm hingedly connected to said front leg proximate said upper end of said front leg,
a bushing slidingly arranged on said handle-bar arm, said bushing comprising a recess receivable of said projection on said bracket, a pair of opposed slider slots and a pin extending through said slider slots, said bushing being spring-loaded toward an engaging position in which said recess receives said projection,
a control element arranged on said handle-bar arm and coupled to said bushing, said control element being structured and arranged to displace said bushing into a disengaging position in which said projection is removed from said recess and said handle-bar arm is pivotable with respect to said front leg, and armrests having a rear portion attached via said pin to a respective one of said handle-bar arms.

12. The stroller of claim 11, wherein said handle-bar arm has a lower portion and an upper portion, said handle-bar arm being hingedly connected to said front leg at said lower portion, said control element being arranged at said upper portion of said handle-bar arm, said control element comprising a control bushing arranged in said upper portion of said handle-bar arm and movable along a predetermined length, and a link element extending in an interior of said handle-bar arm to connect said control bushing to said bushing.

13. The stroller of claim 12, wherein said upper portion of said handle-bar arm comprises a pair of slider slots in opposed relationship to each other, said control element comprising a pin coupled to said control bushing and slidable in said slider slots, said link being connected to said pin.

14. The stroller of claim 11, wherein each of said side frames further comprises a rear leg pivotally connecting to said handle-bar arm.

15. The stroller of claim 11, wherein said handle-bar arm has a tubular section, said bushing being arranged around a portion of said tubular section of said handle-bar arm.

16. A baby stroller, comprising
a chassis having side frames,
each of said side frames including
a front leg having an upper end,
a bracket mounted at said upper end of said front leg and including a projection,
a handle-bar arm having a lower portion and an upper portion hingedly connected to said front leg at said lower portion proximate said upper end of said front leg, said upper portion comprising a pair of slider slots in opposed relationship to each other,
a bushing slidingly arranged on said handle-bar arm, said bushing comprising a recess receivable of said projection on said bracket, said bushing being spring-loaded toward an engaging position in which said recess receives said projection, and
a control element arranged on said upper portion of said handle-bar arm and coupled to said bushing, said control element being structured and arranged to displace said bushing into a disengaging position in which said projection is removed from said recess and said handle-bar arm is pivotable with respect to said front leg and said control element comprising a control bushing arranged in said upper portion of said handle-bar arm and movable along a predetermined length, a link element extending in an interior of said handle-bar arm to connect said control bushing to said bushing, and a pin coupled to said control bushing and slidable in said slider slots, said link being connected to said pin.

17. The stroller of claim 16, wherein each of said side frames further comprises a rear leg pivotally connecting to said handle-bar arm.

18. The stroller of claim 16, wherein said handle-bar arm has a tubular section, said bushing being arranged around a portion of said tubular section of said handle-bar arm.

19. The stroller of claim 16, further comprising an additional pin connected to said bushing and extending through an interior of said handle-bar arm, said link being further connected to said additional pin.

* * * * *